United States Patent
Liu et al.

(10) Patent No.: US 7,366,214 B2
(45) Date of Patent: Apr. 29, 2008

(54) DIODE-PUMPED SOLID-STATE LASER WITH SELF-MAINTAINED MULTI-DIMENSIONAL OPTIMIZATION

(75) Inventors: Dan Liu, Newark, DE (US); Rongsheng Tian, Newark, DE (US); Sean Xiaolu Wang, Centerville, DE (US)

(73) Assignee: B & W Property Inc., Newark, DE (US)

( * ) Notice: Subject to any disclaimer, the term of this patent is extended or adjusted under 35 U.S.C. 154(b) by 193 days.

(21) Appl. No.: 11/224,317

(22) Filed: Sep. 13, 2005

(65) Prior Publication Data

US 2006/0056470 A1 Mar. 16, 2006

Related U.S. Application Data

(60) Provisional application No. 60/609,244, filed on Sep. 14, 2004.

(51) Int. Cl.
*H01S 3/00* (2006.01)

(52) U.S. Cl. ............... 372/38.1; 372/38.02; 372/38.07; 372/69

(58) Field of Classification Search ............... 372/38.1, 372/38.01
See application file for complete search history.

(56) References Cited

U.S. PATENT DOCUMENTS

| | | | |
|---|---|---|---|
| 5,177,755 A | 1/1993 | Johnson | |
| 5,181,214 A | 1/1993 | Berger et al. | |
| 5,265,115 A | 11/1993 | Amano | |
| 5,267,252 A | 11/1993 | Amano | |
| 5,754,574 A * | 5/1998 | Lofthouse-Zeis et al. | 372/34 |
| 6,292,498 B1 | 9/2001 | Pfaff | |
| 2002/0009105 A1* | 1/2002 | Matsumoto | 372/34 |
| 2004/0213304 A1* | 10/2004 | Zemmouri et al. | 372/32 |
| 2004/0228374 A1 | 11/2004 | Ghosh | |
| 2004/0228375 A1* | 11/2004 | Ghosh et al. | 372/32 |

* cited by examiner

*Primary Examiner*—Dung T. Nguyen
(74) *Attorney, Agent, or Firm*—Blank Rome LLP (57) ABSTRACT

A diode-pumped solid-state laser (DPSSL) has self-maintained multi-dimensional optimization. The output property of the DPSSL, including optical power, noise level, and the operation conditions of its individual components, including the drive current and temperature of the laser diode, the temperature of the laser crystals and laser cavity, the drive current of the thermoelectric coolers, is monitored and systematically optimized in real time through automatic electronic control using a microprocessor. Such monitoring and optimization enable the DPSSL to maintain its optimum performance in output power, beam quality, noise level, and stability, throughout its lifetime regardless of component aging and change of environmental conditions. A highly accurate temperature monitoring and control method is also developed.

26 Claims, 6 Drawing Sheets

(12)  United States Patent
US 7,366,214 B2

DIODE-PUMPED SOLID-STATE LASER WITH SELF-MAINTAINED MULTI-DIMENSIONAL OPTIMIZATION

REFERENCE TO RELATED APPLICATION

The present application claims the benefit of U.S. Provisional Application No. 60/609,244, filed Sep. 14, 2004, whose disclosure is hereby incorporated by reference in its entirety into the present disclosure.

FIELD OF THE INVENTION

This invention generally relates to a laser apparatus, and more specifically, to a diode-pumped solid-state laser with self-maintained multi-dimensional optimization.

DESCRIPTION OF RELATED ART

A diode-pumped solid-state laser (DPSSL) is a complex system composed of multiple components including: a diode laser or laser array as the pump source; a laser cavity, which further includes a gain medium, such as a laser crystal or fiber, and a nonlinear medium such as a nonlinear optical crystal or other nonlinear optical media for non-linear optical frequency conversion (including but not limited to frequency doubling, tripling or parametric oscillation); one or more thermal-electric coolers (TECs) for temperature control; and electronic circuits to drive the laser diode and the TECs. Correspondingly, the performance of the DPSSL in its output power, beam quality, noise level, and stability is a complex function of the conditions of these components. With environmental variation and the aging of its constituent components, a monitoring and control system is required to keep the DPSSL in its optimum performance.

The prior arts for DPSSL monitoring and control are limited to monitoring and control of only one or two parameters for some specific components of the DPSSL. Thus the overall performance of the system cannot be guaranteed. Those prior arts include U.S. Pat. No. 5,754,574 to Lofthouse-Zeis, et al., in which the temperature of the diode laser is controlled in accordance with its current to match its wavelength with the external cavity resonance. In U.S. Pat. No. 6,292,498 to Pfaff, et al., the wavelength of the diode laser is monitored and controlled by employing a temperature modulation/detection technique. In U.S. Pat. No. 5,177,755 to Keith Johnson, the noise level of the DPSSL is monitored and used to control the drive current of the diode laser to achieve the lowest relative intensity noise (RIN). In U.S. Pat. No. 5,265,115 to Amano, the drive current of the diode laser is controlled to maintain a constant output power for the DPSSL. In U.S. Pat. No. 5,267,252 to Amano and U.S. Pat. No. 5,181,214 to Berger, et al., the temperature of the laser components is maintained at a constant level by mounting all the components on a common thermal conductive support. In summary, none of these references provides a systematic solution to monitor and control the overall performance of the DPSSL.

SUMMARY OF THE INVENTION

The primary object of the present invention is to systematically and automatically monitor and control the overall performance of the DPSSL, which is a complex multi-dimensional function determined by the operation condition of its individual components, such as the current and temperature of the laser diode, the temperature of the laser crystals, the temperature and length of the laser cavity, and the drive current of the thermal electric coolers (TECs). The method comprises a first step of utilizing multiple sensor elements to monitor the output of the DPSSL and the operation condition of its components and a second step of utilizing a microprocessor to collect the sensor information and adjust the parameters of the individual components to find and maintain an optimum overall performance of the DPSSL. The sensor elements include, but are not limited to, photo detectors to monitor the output power and noise level of the DPSSL, thermistors to monitor the temperature of the laser diode(s), the laser crystal(s), and the laser cavity, and current sensors to monitor the drive current of the laser diode and the TECs.

It is another goal of the current invention to provide a highly accurate temperature monitoring and control method to solve the problem that the thermistors may not reflect the real temperature of the target components as they are generally placed a small distance way from the targets. The method involves utilizing the drive current of the TECs that are used to control the temperature of components as another temperature indicator, since the TEC drive current will vary with environmental temperature to maintain the temperature of the thermistors.

The DPSSL disclosed in this invention can operate at its fundamental lasing frequency (wavelength) or at other frequencies (wavelengths) through non-linear optical conversion such as harmonic generation and parametric oscillation.

BRIEF DESCRIPTION OF THE DRAWINGS

Preferred embodiments of the present invention will be set forth in detail with reference to the drawings, in which:

FIGS. 5 (a) and 5 (b) show the mode patterns of the DPSSL under different laser diode and nonlinear crystal temperatures.

DETAILED DESCRIPTION OF THE PREFERRED EMBODIMENTS

Preferred embodiments of the invention will now be set forth in detail with reference to the drawings.

Figure 1:
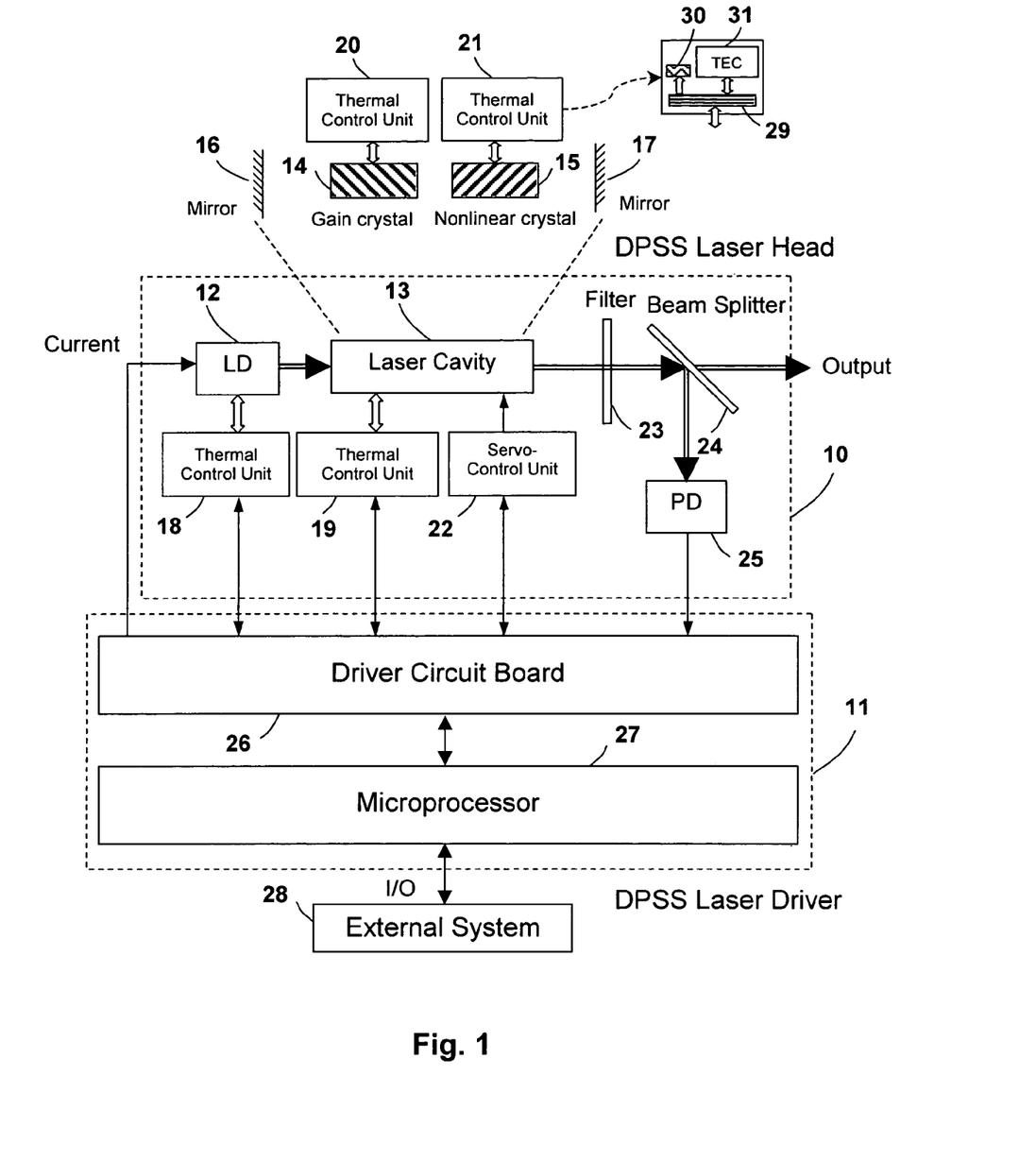
FIG. 1 illustrates a schematic view of the multi-dimensional optimized DPSSL.

In one preferred embodiment of the current invention as shown in FIG. 1, the DPSSL comprises a laser head 10 and a laser driver 11. The laser head 10 further comprises a laser diode 12 as the pump source; a laser cavity 13 formed by laser gain crystal 14, nonlinear optical crystal 15 and two mirrors 16, 17; thermal control units 18, 19 for monitoring and controlling the temperature of the laser diode 12 and the laser cavity 13, respectively (the thermal control unit 19 further comprising thermal control units 20, 21 for monitoring and controlling the temperature of the laser gain crystal 14 and the nonlinear optical crystal 15, respectively);

a servo-control unit 22 for fine tuning of the laser cavity length; an optical filter 23 to select the desired DPSSL output wavelength; and a beam splitter 24 to tap a portion of the output power and send it to a photo detector 25 to monitor the power and noise level of the DPSSL. Each thermal control unit comprises a heat sink 29, a thermistor 30 attached to the heat sink 29 as temperature sensor, and a TEC 31 for temperature control.

In this specific embodiment, the laser diode 12 emits at a center wavelength of 809 nm. The laser gain crystal 14 is a Nd: $YVO_4$ crystal, which emits at 1064 nm under the diode pump. The nonlinear optical crystal 15 is a KTP crystal, which doubles the laser frequency and results in a laser output at 532 nm. The two mirrors 16, 17 are formed by depositing thin film reflectors on the corresponding surfaces of the laser gain crystal 14 and the nonlinear crystal 15, respectively. The servo-control unit 22 is composed of piezo-electric micro-positioners to fine tune the relative position of the laser gain crystal 14 and the nonlinear optical crystal 15. The laser driver 11 further comprises a driver circuit board 26 to drive the laser diode, the TECs, and the micro-positioners, and a microprocessor 27 for intelligent monitoring and control. The information collected by the sensor elements, including the laser power and noise level that is obtained by the photo detector 23, the temperature of the laser diode and the laser cavity that is obtained by the thermal control units 18, 19, the drive current of the laser diode and the TECs, the drive voltage of the micro-positioners, are all fed into the microprocessor 27 via A/D conversion to monitor the overall performance of the DPSSL. Based on the collected information, the microprocessor controls and adjusts the operating conditions of individual components in the laser head 10, including the drive current and temperature of the laser diode, the temperature of the gain crystal and nonlinear crystal, the drive current of the TECs, and the drive voltage of the micro-positioners, by controlling the driver circuit board 26 via D/A conversion to achieve and maintain the optimum overall performance of the DPSSL. The microprocessor 27 also has the capability of sending alarm signals to an external system 28, which in most cases corresponds to the instrument the laser is embedded inside, through its communication port when the DPSSL performance does not reach the specifications. The microprocessor 27 can also receive and react up on any particular command from the external system 28.

Figure 2:
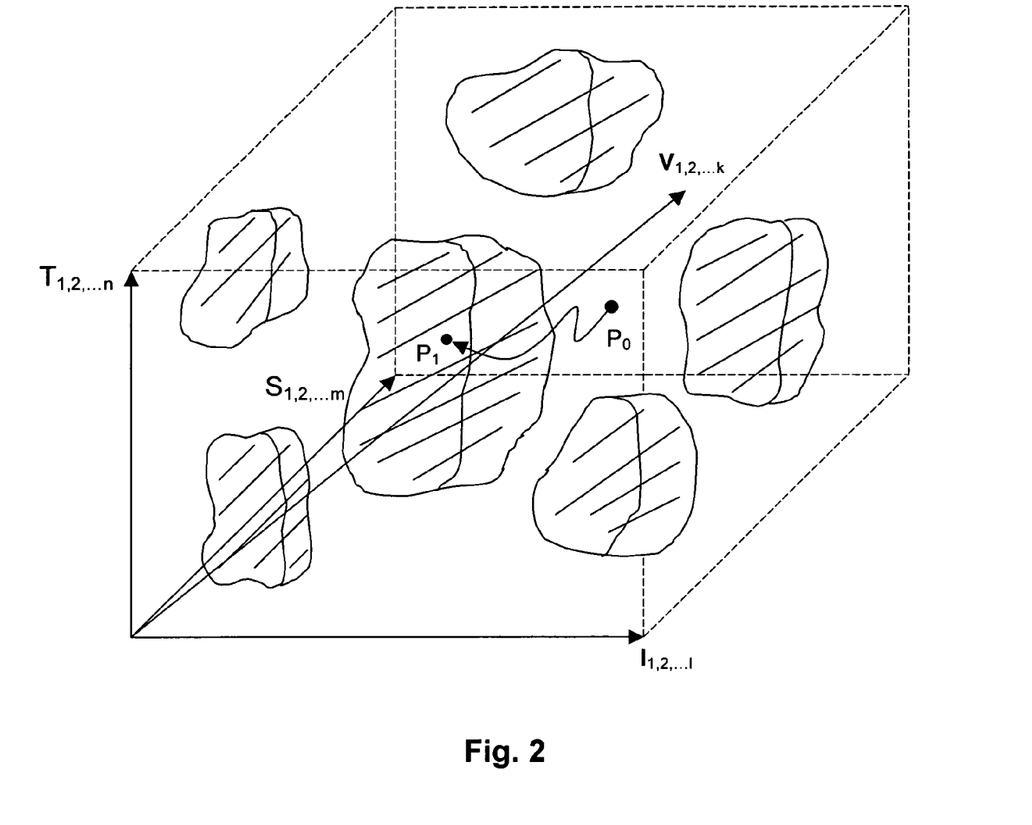
FIG. 2 illustrates a schematic view of the multi-dimensional optimization mechanism.

FIG. 2 illustrates the multi-dimensional optimization mechanism for the DPSSL. The operating conditions for individual components of the DPSSL, such as the drive current applied on the laser diode (or diode array) and on the TECs ($I_1, I_2, \ldots, I_l$), the drive voltage applied on the piezo-electric micro-positioners ($V_1, V_2, \ldots, V_k$), the temperature of the laser diode and the laser crystals ($T_1, T_2, \ldots, T_n$), the length of the laser cavity, the relative position between the laser crystals ($S_1, S_2, \ldots, S_m$), form a multi-dimensional system. There are some operating conditions (the shadowed regions in FIG. 2) under which the DPSSL has the best overall performance. In the current embodiment, the microprocessor can automatically locate these optimum conditions by scanning the setting of each component in certain ranges. This is preferred for manufacturing automation, repair and replacement, and field maintenance, as different laser heads and different electronic parts become interchangeable with the coordination of the microprocessor, which acts as an automatic 'match maker' for the laser head and laser driver. The microprocessor can also correct the preset operating conditions ($P_0$ in FIG. 2) by monitoring the output status of the DPSSL and adjusting the settings for each component in real time until an optimum operation condition is found ($P_1$ in FIG. 2). In case of environmental variation (such as temperature change) and component aging, the microprocessor can automatically change the component settings to maintain the optimum performance for the DPSSL over its whole lifetime. To increase the searching speed, the microprocessor may scan in the vicinity of certain optimum conditions that are pre-loaded in its memory during the manufacturing process.

Figure 3:
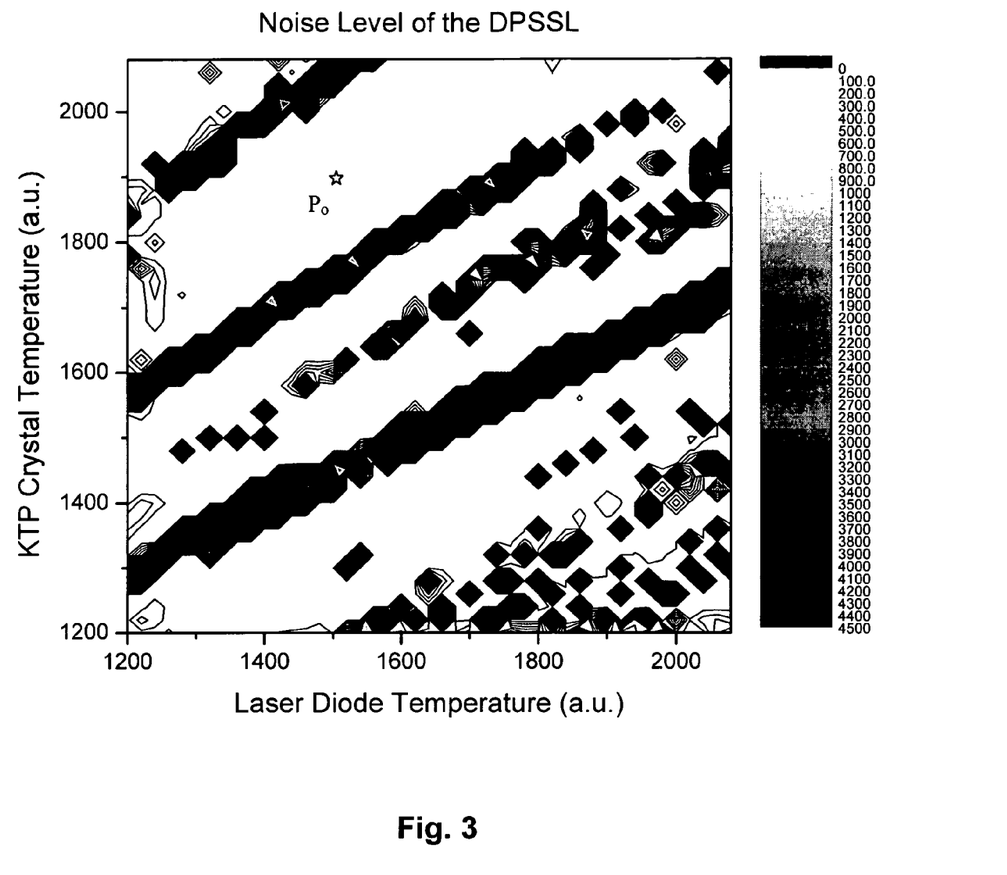
FIG. 3 shows one example of the optimization process, where the noise levels of the DPSSL are measured under different laser diode and nonlinear crystal temperatures.
Figure 4:
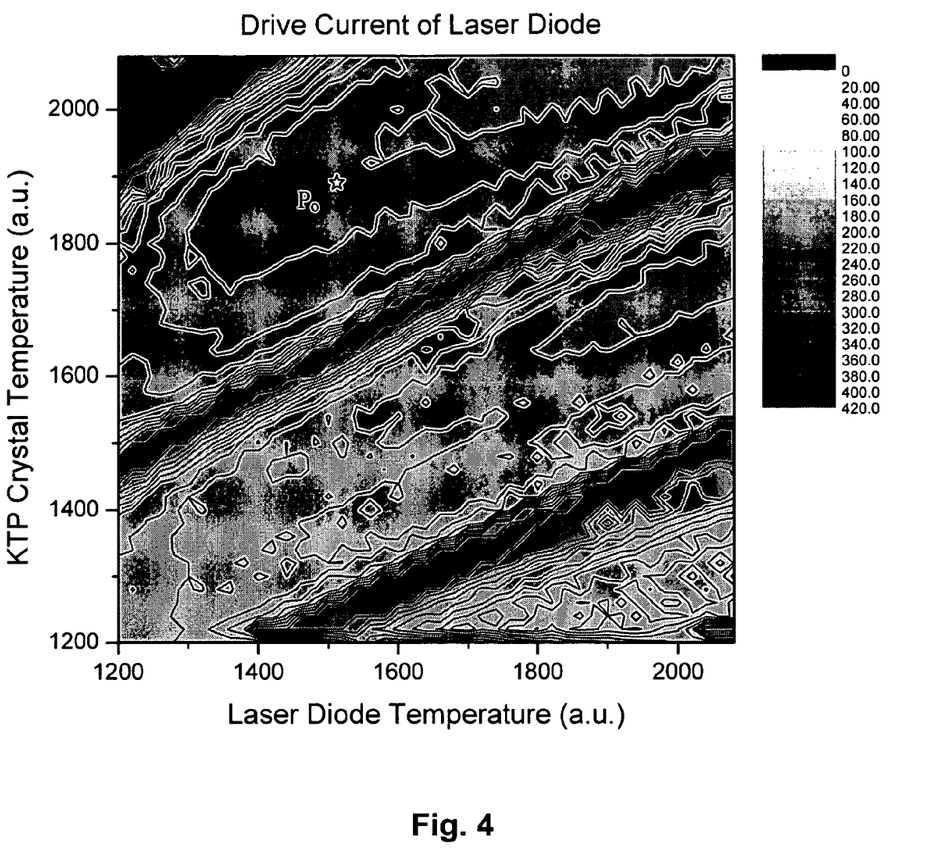
FIG. 4 shows another aspect of the optimization process, where the drive currents of the laser diode are measured under different laser diode and nonlinear crystal temperatures.

One example of the multi-dimensional optimization process is shown in FIG. 3 and FIG. 4, in which the DPSSL operates in a constant output power mode. A feedback control circuit on the driver circuit board 26 is used to automatically adjust the laser diode drive current according to the power level of the DPSSL that is measured by the photo detector 25. In this example, the temperature of the laser diode and the temperature of the nonlinear crystal (KTP in the current embodiment) are the two target variables that need to be optimized. The drive current of the laser diode, and the noise level of the DPSSL, which is measured from the DPSSL power fluctuation over a time period, are used as the two criteria for the optimization process. The goal of the optimization process is to achieve a low noise level and a low drive current simultaneously at an optimized laser diode and nonlinear crystal temperature setting. The microprocessor 27 performs a two-dimensional scan on the temperature setting of the laser diode and the nonlinear crystal by adjusting the corresponding TEC drive current and records the variation of the noise level of the DPSSL, which is measured by the photo detector, and the drive current of the laser diode, which is automatically adjusted by the feedback control circuit to maintain the DPSSL output power.

FIG. 3 shows the measured noise level variation of the DPSSL at different laser diode and nonlinear crystal temperatures. The temperature values are measured from the resistance values of the thermistors in the corresponding thermal control unit. The resistance range of the thermisters corresponds to a temperature range from 37° C. to 16° C. In FIG. 3, the noise level is represented by the gray scale of the data points, where a dark shade corresponds to a high noise level while a light shade corresponds to a low noise level.

FIG. 4 shows the measured drive current variation of the laser diode during the scan process. The current value is represented by the gray scale of the data points in a similar way as in FIG. 3. It can be seen that both the noise level and the drive current are complicated functions of the two temperature settings. At certain temperature settings, the DPSSL achieves low noise level and low drive current simultaneously. These points are treated as 'good' temperature settings. The function of the microprocessor is to locate an optimum temperature setting (such as point $P_0$ in FIG. 3 and FIG. 4), where both low noise level and low drive current are achieved and maintained over a wide temperature range around the optimum setting. The optimum position can be located through many well-known mathematical methods.

Figure 5:
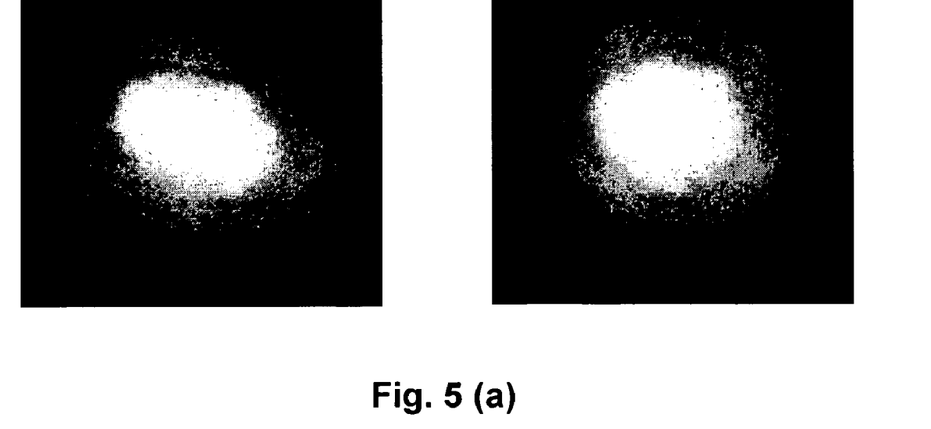

In the above embodiment, the output power, noise level, and the stability of the DPSSL can be directly monitored by the microprocessor. The beam quality, the mode pattern, the polarization and other parameters of the laser output are treated as implicit functions of the first three parameters as they are closely related. An example of this relationship is shown in FIGS. 5 (a) and (b), where the transverse mode pattern and intensity profile of the DPSSL are measured by a laser beam profiler at a non-optimized temperature setting (left) and an optimized temperature setting (right). FIG. 5 (a) shows the transverse mode pattern. FIG. 5 (b) shows the transverse intensity profile, i.e., intensity variation of the laser beam over its two main axes. The elliptically shaped mode pattern for the non-optimized temperature setting indicates the existence of higher order transverse modes. In other embodiments of the present invention, the single element photo detector can be replaced with a photo detector array to monitor the beam quality and the mode pattern directly. More components, including but not limited to cavity length stabilizers, polarization controllers, and transverse and longitudinal mode regulators, can be added in the laser head with their status monitored and controlled by the microprocessor. The laser cavity and crystals can also be replaced with optical fibers to form a diode-pumped fiber laser, which can be viewed as a special case of the DPSSL.

Figure 6:
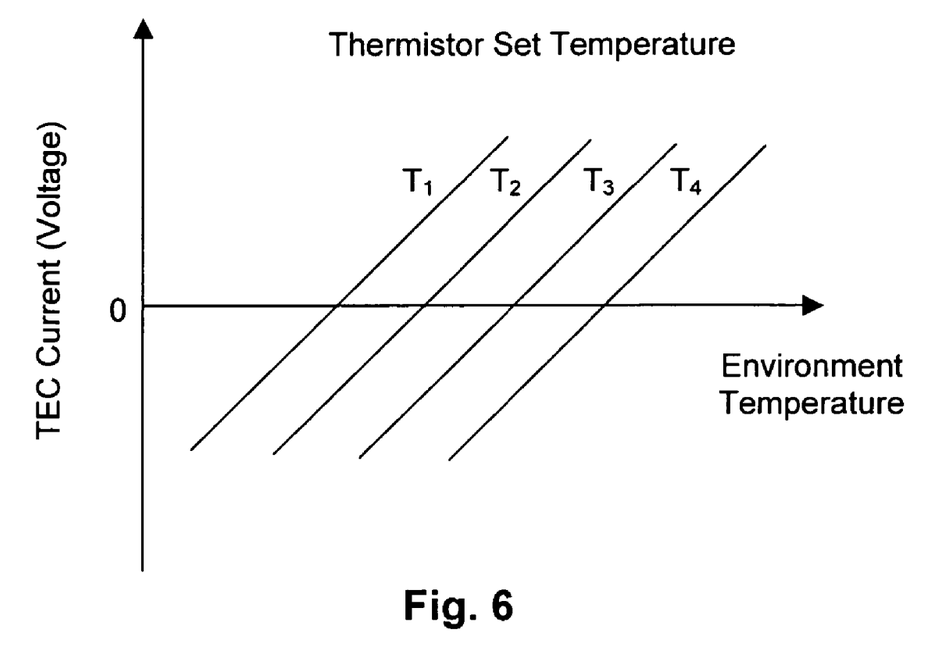
FIG. 6 illustrates the mechanism of using TEC current (voltage) as another temperature indicator for accurate component temperature control.

To make the DPSSL work in consistent performance under environmental temperature changes, the temperature sensors in the laser head, such as the thermistors in the present embodiment, must be able to measure the temperature of the components very accurately. However, owing to the physical separation between the thermistor and the component, their temperature may differ due to thermal resistivity. The current invention provides a new method to compensate this temperature gap. In the laser head, the current (voltage) applied on the TECs is adjusted in proportion to environmental temperature to stabilize the temperature of the thermistors that are placed close to the components. Thus the TEC current (voltage) can be used as another temperature indicator for certain thermistor settings ($T_1$, $T_2$, $T_3$ ... ), as illustrated in FIG. 6. In a preferred embodiment, the microprocessor adjusts the temperature setting of the thermistors according to the voltage on the TECs when the environmental temperature changes to keep the temperature of the components stable. In another embodiment, the temperature of the laser case (or temperatures at other parts of the laser) is monitored, which reflects the environmental temperature changes. The microprocessor will use the temperature in combination with a preloaded look-up-table to generate a new thermistor setting temperature so that the temperature of the components can be accurately maintained at changing environmental temperatures While various exemplary embodiments of the current invention have been set forth above, those skilled in the art who have reviewed the present disclosure will readily appreciate that other embodiments can be realized within the scope of the present invention. For example, numerical values and recitations of particular substances are illustrative rather than limiting. Therefore, the present invention should be construed as limited only by the appended claims.

We claim:

1. A multi-dimensional optimized diode-pumped solid-state laser (DPSSL), the DPSSL comprising:
   a. a laser head for producing a laser output power, the laser head comprising sensors for sensing a plurality of operational parameters of the DPSSL and controllers for controlling the plurality of operational parameters; and
   b. a laser driver to drive and control the laser head in accordance with the plurality of operational parameters sensed by the sensors by determining optimal values of the plurality of operational parameters and controlling the controllers to implement the optimal values;
   wherein:
   the laser head comprises a laser diode as a pump source and laser crystals and mirrors defining a laser cavity; and the sensors and controllers comprise:
   thermal control units for temperature control and monitoring of said laser diode and laser crystals;
   servo-control units for fine tuning the relative position of the laser crystals;
   a filter for selecting a laser output wavelength;
   a beam splitter for tapping a portion of the laser output power; and
   a photo detector for monitoring the tapped laser output power.

2. The DPSSL of claim 1, wherein each thermal control unit comprises:
   a. a heat sink for maintaining a temperature of a target component which is one of the sensors and controllers;
   b. a thermistor attached to the heat sink for monitoring the temperature of the heat sink and the target component; and
   c. a thermal-electric cooler (TEC) for controlling the temperature of the heat sink and the target component.

3. The DPSSL of claim 1, wherein the servo-control units comprise piezo-electric micro-positioners.

4. The DPSSL of claim 1, wherein the laser driver comprises:
   a. a driver circuit board for driving each of the controllers of the laser head; and
   b. a microprocessor for determining the optimal values and for controlling the driver circuit board in accordance with the optimal values.

5. The DPSSL of claim 1, wherein the laser output power that is measured by the photo detector is transferred to the laser driver to analyze a power level, noise level, and short-term/long-term stability of the DPSSL, and wherein the operational parameters of individual components in the laser head, comprising a drive current of the laser diode drive currents of the thermal control units, a temperature of the laser diode, a temperature of the laser cavity, temperatures of the laser crystals, and a drive voltage of the servo-control units, are also transferred to the laser driver to determine an overall performance of the DPSSL in combination with said power level, noise level and stability information of the DPSSL.

6. The DPSSL of claim 1, wherein the operational parameters of individual components in the laser head are controlled by the laser driver in an automatic and systematic method to achieve an optimum overall performance for the DPSSL.

7. The DPSSL of claim 1, wherein the laser driver automatically scans the operational parameters of individual components in the laser head within a preset ranges until an optimum overall performance of the DPSSL is achieved.

8. The DPSSL of claim 7, wherein the laser driver comprises a memory, and wherein the laser driver scans in the vicinity of certain optimum conditions that are preloaded in said memory.

9. The DPSSL of claim 1, wherein the laser driver automatically adjusts the operational parameters of individual components in the laser head to maintain an optimum DPSSL performance in case of environmental change.

10. The DPSSL of claim 1, wherein the laser driver automatically adjusts the operational parameters of individual components in the laser head to maintain an optimum DPSSL performance over a lifetime of the DPSSL in case of component aging.

11. The DPSSL of claim 1, wherein the laser head further comprises thermistors, and wherein the laser driver uses currents applied on the thermal controllers as environmental temperature indicators in addition to outputs of the thermistors for maintaining optimized DPSSL operation over an environmental temperature range.

12. The DPSSL of claim 1, further comprising a laser case, and wherein the laser driver monitors a temperature of the laser case for maintaining optimized DPSSL operation over an environmental temperature range.

13. The DPSSL of claim 1, wherein the laser driver comprises a communication port, and wherein the laser driver receives commands from an external system and sends alarm signals to the external system through the communication port when DPSSL performance does not reach a predetermined specification.

14. A multi-dimensional optimized diode-pumped solid-state laser (DPSSL), the DPSSL comprising:
  a laser head for producing a laser output power, the laser head comprising sensors for sensing a plurality of operational parameters of the DPSSL and controllers for controlling the plurality of operational parameters;
  a laser driver to drive and control the laser head in accordance with the plurality of operational parameters sensed by the sensors by determining optimal values of the plurality of operational parameters and controlling the controllers to implement the optimal values; and
  photo detector arrays for monitoring beam quality and mode pattern of the laser, cavity length stabilizers, polarization controllers for monitoring and controlling polarization of the laser, and transverse and longitudinal mode regulators, with their status monitored and controlled by the laser driver.

15. A method for optimizing a diode-pumped solid-state laser (DPSSL), the DPSSL comprising a laser head and a laser driver, the laser head comprising a laser diode, laser crystals and mirrors defining a laser cavity, thermal control units, servo-control units and a photo detector, the laser driver comprising a driver circuit board and a microprocessor, the method comprising:
  a. monitoring a laser output power through the photo detector and monitoring a plurality of operational parameters of individual components in the laser head, including a drive current of the laser diode, drive currents of the thermal control units, a temperature of the laser diode, a temperature of the laser cavity, temperatures of the laser crystals, and a drive voltage of the servo-control units; and
  b. controlling the plurality of operational parameters through the microprocessor and the driver circuit board to achieve an optimum overall performance for the DPSSL.

16. The method of claim 15, wherein the laser output power that is measured by the photo detector is transferred to the laser driver to analyze a power level, noise level, and short-term/long-term stability of the DPSSL, and wherein the operational parameters of individual components in the laser head, comprising a drive current of the laser diode, drive currents of the thermal control units, a temperature of the laser diode, a temperature of the laser cavity, temperatures of the laser crystats, and a drive voltage of the servo-control units, are also transferred to the laser driver to determine an overall performance of the DPSSL in combination with said power level, noise level and stability information of the DPSSL.

17. The method of claim 15, wherein the operational parameters of individual components in the laser head are controlled by the laser driver in an automatic and systematic method to achieve an optimum overall performance for the DPSSL.

18. The method of claim 15, wherein the laser driver automatically scans the operational parameters of individual components in the laser head within a preset ranges until an optimum overall performance of the DPSSL is achieved.

19. The method of claim 18, wherein the laser driver further comprises a memory, and wherein the laser driver scans in the vicinity of certain optimum conditions that are preloaded in said memory.

20. The method of claim 15, wherein the laser driver automatically adjusts the operational parameters of individual components in the laser head to maintain an optimum DPSSL performance in case of environmental change.

21. The method of claim 15, wherein the laser driver automatically adjusts the operational parameters of individual components in the laser head to maintain an optimum DPSSL performance over a lifetime of the DPSSL in case of component aging.

22. The method of claim 15, wherein the laser head further comprises thermistors, and wherein the laser driver uses currents applied on the thermal controllers as environmental temperature indicators in addition to outputs of the thermistors for maintaining optimized DPSSL operation over an environmental temperature range.

23. The method of claim 15, wherein the DPSSL further comprises a laser case, and wherein the laser driver monitors a temperature of the laser case for maintaining optimized DPSSL operation over an environmental temperature range.

24. The method of claim 15, wherein the laser driver comprises a communication port, and wherein the laser driver receives commands from an external system and sends alarm signals to the external system though the communication port when DPSSL performance does not reach a predetermined specification.

25. A method for optimizing a diode-pumped solid-state laser (DPSSLV the DPSSL comprising a laser head and a laser driver, the laser head comprising a laser diode, laser crystals and mirrors defining a laser cavity, thermal control units, servo-control units and a photo detector, the laser driver comprising a driver circuit board and a microprocessor, the method comprising:
  a. monitoring a laser output power through the photo detector and monitoring a plurality of operational parameters of individual components in the laser head, including a drive current of the laser diode and the thermal control units, a temperature of the laser diode, the laser cavity and the laser crystals, and a drive voltage of the servo-control units; and
  b. controlling the plurality of operational parameters through the microprocessor and the driver circuit board to achieve an optimum overall performance for the DPSSL;
  wherein the laser head further comprises photo detector arrays for monitoring beam quality and mode pattern of the laser, cavity length stabilizers, polarization controllers for monitoring and controlling polarization of the laser, and transverse and longitudinal mode regulators, with their status monitored and controlled by the laser driver.

26. A multi-dimenstional optimized diode-pumped solid-state laser, the laser comprising:
  a laser head for producing a laser output power, the laser head comprising sensors for sensing a plurality of operational parameters of the laser and controllers for controlling the plurality of operational parameters; and
  a laser driver to drive and control the laser head in accordance with the plurality of operational parameters sensed by the sensors by determining optimal values of the plurality of operational parameters and controlling the controllers to implement the optimal values; wherein:

the laser head comprises a laser diode as a pump source and laser crystals and mirrors defining a laser cavity; and the sensors and controllers comprise:

thermal control units for temperature control and monitoring of said laser diode and laser crystals;

servo-control units for fine tuning the relative position of the laser crystals;

a filter for selecting a laser output wavelength;

a beam splitter for tapping a portion of the laser output power; and a photo detector for monitoring the tapped laser output power.

\* \* \* \* \*